United States Patent [19]

Stites et al.

[11] 4,209,238
[45] Jun. 24, 1980

[54] MICROFILM TRANSPORT WITH SHUTTERED LENS AND GLASS FLAT CONTROL

[75] Inventors: David G. Stites, Elgin; John R. Flint, Barrington; Michael L. Kreuser, Evanston, all of Ill.

[73] Assignee: Bell & Howell Company, Chicago, Ill.

[21] Appl. No.: 900,352

[22] Filed: Apr. 26, 1978

[51] Int. Cl.² .................. G03B 21/20; G03B 23/12
[52] U.S. Cl. ........................................... 353/85
[58] Field of Search .................. 353/88, 85, 25–27, 353/23

[56] References Cited

U.S. PATENT DOCUMENTS

| | | | |
|---|---|---|---|
| 1,262,578 | 4/1918 | Cameron | 353/85 |
| 1,277,558 | 9/1918 | Dumars et al. | 353/88 |
| 3,354,776 | 11/1967 | Smitzer et al. | 353/85 X |
| 3,604,793 | 9/1971 | Wangerin | 353/26 A |
| 3,640,614 | 2/1972 | Cassano et al. | 353/26 R |
| 3,751,152 | 8/1973 | Rinehart | 353/27 A X |
| 3,809,468 | 5/1974 | Moritz | 353/27 A |
| 3,956,579 | 5/1976 | Doumit | 353/94 X |
| 4,110,020 | 8/1978 | Johnson et al. | 353/26 A |

*Primary Examiner*—Harry N. Haroian
*Attorney, Agent, or Firm*—Alan B. Samlan

[57] ABSTRACT

A film transport mechanism moves film from area to area and then stops it to project an image. During the period while the film is being transported, the lens is shuttered and glass flats on either side of the film are opened. This way, the viewer does not see a blurred montage of images being moved across a screen at a high rate of speed, and there is a much less chance of scratching film. The shutter may be either a mechanical blade which cuts across a beam of light or an electrical circuit which dims a light supply to darken the screen. Dimming is preferred to switching a lamp off or on since it is much less damaging to a filament if it remains continuously energized.

2 Claims, 7 Drawing Figures

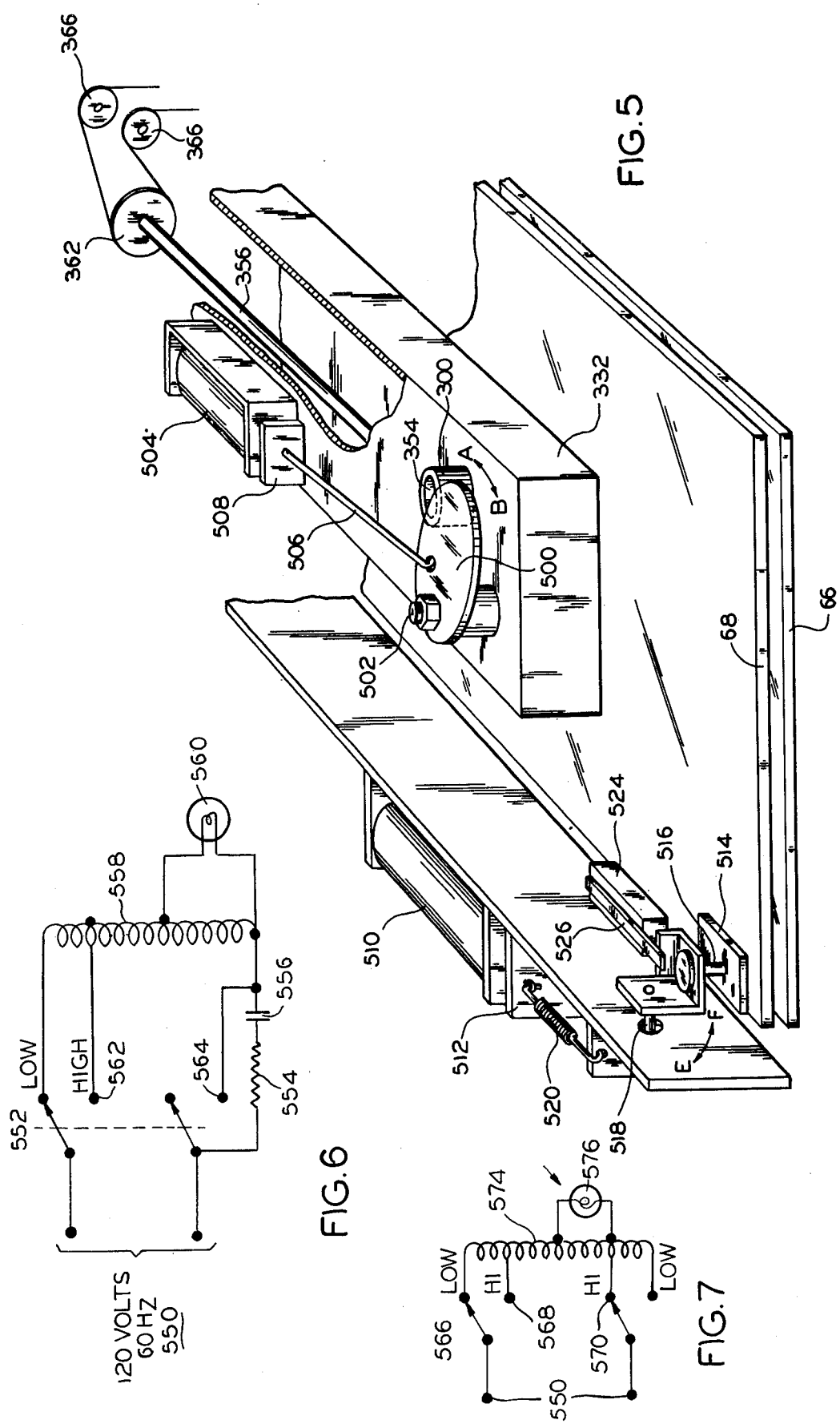

MICROFILM TRANSPORT WITH SHUTTERED LENS AND GLASS FLAT CONTROL

Reference is made to copending patent applications Ser. No. 711,180, filed Aug. 3, 1976 now U.S. Pat. No. 4,110,020 by Delmar Johnson et al, inventors, and to Ser. No. 741,929, filed Nov. 15, 1976 by J. R. Flint et al, inventors, both of which are assigned to the assignee of this invention. These and other copending applications show and explain many of the details contained herein.

This invention relates to microfilm transport devices and more particularly to transports having a shuttered lens and open glass flats during film transport.

A microfilm reader or reader/printer is a device which displays images previously recorded on a strip of film. The device generally contains provisions for transporting a suitable supply of film to a take-up device. As the film is transported, it must be moved, stopped and moved again. Very often, the same film is moved and stopped many times before it is finally removed from the reader or reader/printer.

This transport of film presents a number of problems. First, it is disconcerting and fatiguing for someone who is watching a screen to be confronted by a blurred montage of images streaking across the screen. If the person should spend an entire working day before such a screen, the problems are enhanced. Second, each time that the film is moved, there is a chance that it might be damaged. It is necessary to press the film between parallel plates of glass (called "glass flats") so that it will lie flat and be in a flat focal plane. These glass plates or flats are likely to scratch the film if they are not opened during movement of the film. These and other problems are compounded when the film transport is automatically controlled.

For example, the above-identified copending patent application discloses a microfilm reader or reader/printer device which is controlled by a microprocessor. Film is loaded into the device, threaded between glass flats and taken up. The operator signals the identity of a desired image to a microprocessor. As the film moves under control of the microprocessor, sensors detect when a desired image is in a position to be projected onto an adjacent screen. Then the film is stopped and so projected. The particular devices that are disclosed herein are referred to herein only by way of a non-limiting example. The same problems may also be found in many other transport systems.

Accordingly, an object of the invention is to provide new and improved control over the movement of microfilm and the display of images recorded thereon. In particular, an object is to provide means for shuttering a lens and opening glass flats during film transport.

A further object of the invention is to provide several alternative ways of shuttering the lens. More particularly, an object is to provide a first way of shuttering the lens by means of a mechanical device which may cut off a beam of light at all times except when a film is actually in a reading position. An alternative and preferred object is to provide an electrical control circuit which apparently switches a beam of light off or on, in order to shutter the lens. Here, an object is to avoid continuous energization and de-energization of a lamp, which tends to be destructive of the filament.

Another object is to provide a process for accomplishing the above-cited objects in fully automatic film transport mechanisms controlled by a microprocessor. Here, an object is to provide for the realization of such objects in readers and reader/printers controlled by microprocessors, especially—but not exclusively—the reader or reader/printer disclosed in the above-identified copending applications.

In keeping with an aspect of the invention, these and other objects are accomplished by either of two embodiments. A first embodiment uses a solenoid-controlled lens shutter and glass flat mechanism. In a second and preferred embodiment, a filament of a lamp is energized at either a high or a low level, which has the effect of shuttering or unshuttering the lens. The lens is shuttered and the glass flats open while the film is transported and until a desired image is found. Then the film stops, the glass flats close, and the lens is unshuttered. Hence, the film is stopped and pressed between glass flats at all times while the lens shutter is open.

The nature of a preferred embodiment of the invention is shown in the attached drawings, wherein:

FIG. 5 shows the lens shutter and glass flat control mechanism used in conjunction with the microfilm reader or reader/printer of FIGS. 1-4;

FIG. 6 shows an electrical circuit for energizing a lamp at a high or low level; and FIG. 7 shows an alternative electrical circuit for energizing a lamp at a high or low level.

Figure 1:
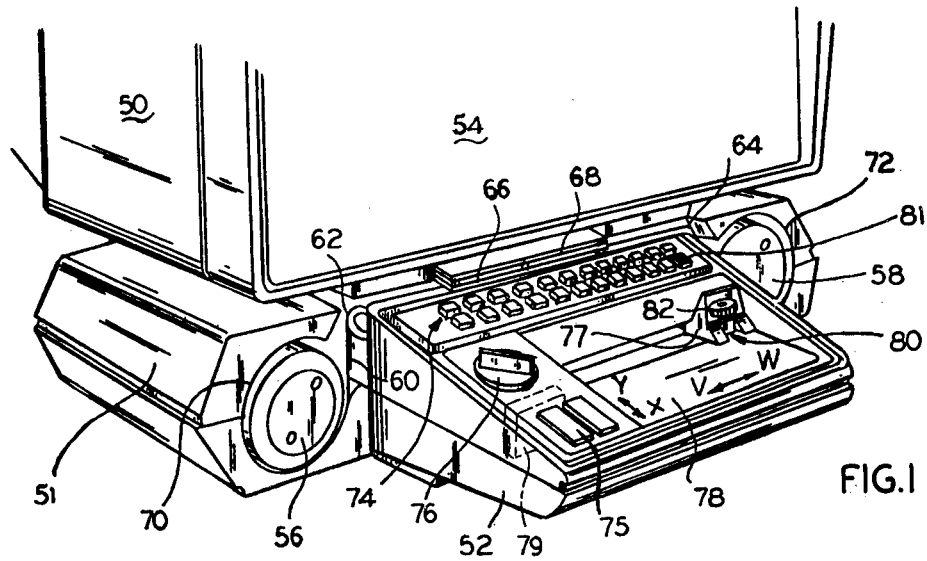
FIG. 1 shows in perspective a microfilm reader or reader/printer.

The FIGS. 1-4 are taken from the above-identified copending patent applications; therefore, their description will be brief. Further details will become more apparent by reading those applications. To facilitate such a reading, the original reference numerals are preserved in FIGS. 1-4.

Briefly, the reader or reader/printer (FIG. 1) comprises a hood 50, a film transport mechanism 51, and a control panel 52. The hood 50 includes a rear illuminated screen 54, in front of a cavity large enough to sustain a beam of light which contains the projected microfilm image.

The film transport mechanism includes a supply (relative to forward film transport) roll or reel 56, a take-up roll or reel 58 and a web, here shown in the form of a length of film 60 extending therebetween. Preferably the reels 56,58 have spools, hubs, or film cores with as large a diameter as possible so that there will be a minimum of internal working within the film itself. Any suitable number of guide rollers may also be provided (as shown at 62,64) to convey the web or film 60 smoothly and evenly through the reader or reader/printer. As the web or film travels between rollers 62,64, it passes between two flat glass plates 66,68 (usually called "glass flats") which are closely spaced to hold the film, and therefore the microfilm images, at a precisely positioned, vertically oriented location relative to the lens system (not seen in FIG. 1).

In order to load a web or strip, such as film 60, into the reader or reader/printer of FIG. 1, the web or strip is pulled from the hub, reel, or core 56, passed between the glass flats 66,68 and attached to the hub, reel or core 58.

The control panel 52 includes a photographic area selector in the form of a plurality of push buttons 74 and a rotary switch 76. The rotary switch may be turned to select a book and the push buttons may be operated to select a chapter in that book. In the example of a large service parts center, the book might be "lawn mowers" and the chapter might be "engine." Therefore, the switches 76,74 may be marked directly with these words. This way, the service or repairman using the reader or reader/printer may follow his customary procedures of selecting book and chapter, which procedures he conventionally followed before he received the microfilm.

Any other additional control, such as switch 75, may be provided to switch the reader or reader/printer or lamp off/on or to cause any other suitable functions.

The photographic area representing a book and chapter is automatically delivered to a reading or viewing position, under control of a microprocessor symbolically shown at 79. Once the film is so delivered, it remains stationary. The operator grasps a handle 77 and moves it over an index printed on plate 78. When handle 77 reaches a selected point, a desired index on the plate 78 appears in a window 80 associated with handle 77, and a corresponding page or image on microfilm 60 is projected onto the reader or reader/printer screen 54. A thumb wheel 82 on handle 77 may be turned to focus the image projected onto the screen 54.

Figure 2:
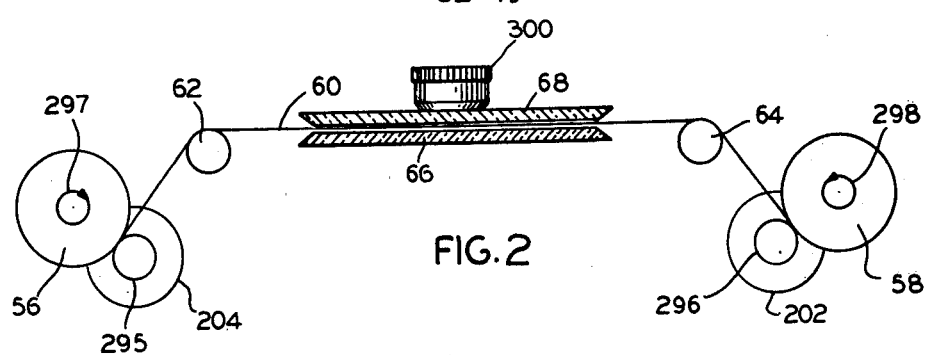
FIG. 2 is a schematic side view of a film transport mechanism.

FIG. 2 shows the glass flats 66,68 in a closed or reading position. In this position, a lens holder 300 floats loosely on the top of the upper glass flat 68. However, the film 60 might be scratched if it is pulled between the flats while they are clamped shut, and it is desirable to open the flats during film transport. Any suitable means (not shown) automatically moves the lens holder 300 from the reading position on top of the movable glass flat 68, either before or as it opens.

Figure 3:
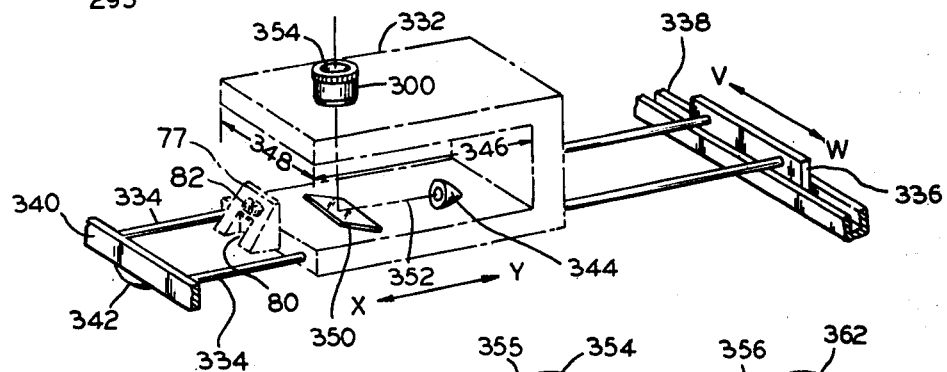
FIG. 3 shows a lens transport mechanism for scanning an image on a film in the reader or reader/printer.

FIG. 3 shows the mechanical structure which is used to select and project the photographic area image which is to be displayed. This image-selecting mechanism comprises a yoke 332 mounted on a transport mechanism coprising a pair of horizontal bars 334 and sliding block 336. The sliding block rides in any suitable channel 338, which is rigidly attached to the reader of FIG. 1, to slide back and forth in directions V and W. For example, the slide may be somewhat similar to the slides conventionally used to mount file cabinet drawers.

At one end, each of the two bars 334 are rigidly mounted in and move with the block 336 and as it travels back and forth in the V-W directions. The opposite ends of bars 334 are rigidly attached to a block 340 which freely rests, under gravity, on the index plate 78 (FIG. 1) of the reader. A small foot or glider 342 is formed on the bottom of block 340 so that it slides with little friction in directions V-W.

The yoke 332 slides freely in directions X-Y along the length of the two bars 334. Therefore, if the handle 77 and therefore the yoke 332 is moved, an indexing mechanism (window 80) may be moved to any selected place on the index plate 78. This movement places lens holder 300 directly over the selected image.

The yoke 332 has an opening 346,348 for receiving both the glass flats 66,68 and the film 60. Neither the film nor the glass flats touch the yoke 332, itself. A light source 344 is positioned beneath the opening 346,348. In front of the light source 344 is a mirror 350, designed to reflect only visible light, which is set at a 45° angle with respect to the X-Y direction. Therefore, a horizontal beam of light 352, from source 344, is reflected at a right angle to pass vertically through the film and a lens 354, in lens holder mount 300 and the infrared energy is transmitted so as not be passed into the film and absorbed in the form of heat. Accordingly, it should be clear that the lens 354, which is placed over and integrally travels with the light source 344 and mirror 350, may be placed under any selected image in the photographic area which is clamped between the glass flats at the time of projection. This way, any image in the photographic area may be projected toward screen 54, along the optical path represented by the dot-dashed line 352.

The yoke 332 is constructed to enable the lens holder 300 to float loosely and freely, directly upon the upper surface of the glass flat 68. By resting directly upon the glass, the lens holder is always positioned normal to and exactly the same distance away from the microfilm. Inside the lens holder 300 is a telescoping lens mount 355 which may be moved up or down in order to initially focus the image of the photographic area upon the screen 54. The focus need not be readjusted since the constant glass thickness maintains the setting over the entire format being projected.

Figure 4:
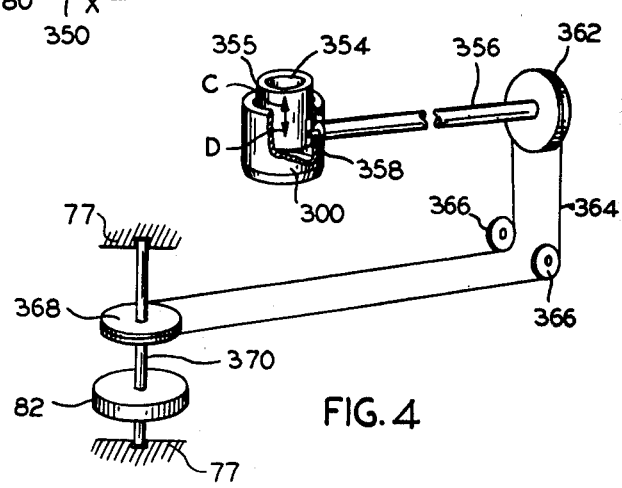
FIG. 4 shows a focusing mechanism for use in the transport mechanism of FIG. 3.

The mechanism for focusing the lens is shown in FIG. 4. More specifically, the lens holder 300 is vertically oriented and the lens mount 355 is arranged for telescoping motion within the holder. Adjacent the lens mount 355 is a rotatably mounted horizontal shaft 356 having an eccentric elongation or cam 358 integrally formed thereon. The cam engages the telescoping lens mount 355. Therefore, as the shaft 356 rotates, the lens mount 355 moves, within the lens holder 300, up or down in directions C-D.

A pulley wheel 362 is rigidly attached to the end of shaft 356. A dial cord 364 is trained over the pulley 362, two idler wheels 366,366 and a horizontally oriented pulley wheel 368. The thumb wheel 82 (FIGS. 1 and 4) is mounted on and turns with the same shaft 370 that carries the pulley wheel 368. Therefore, as the thumb wheel 82 is rotated, the pulley 368 turns, to pull the dial cord 364. The cord 364 turns pulley 362 to rotate shaft 356 and raise or lower the lens mount 355. This entire focusing mechanism (FIG. 4) is mounted on and carried by the yoke 332 (FIG. 3). Therefore, the focusing mechanism moves with the yoke, responsive to a manipulation of the handle 77 in order to make possible a one-handed control over both the focusing and the positioning of the lens. Also, the shaft 356 may be adapted to swivel about the axis of the idler wheels 366,366 so that the lens holder may raise or lower as the upper glass flat 68 raises or lowers.

According to the invention, the lens is shuttered, either mechanically or electrically, during intervals while the microfilm is being transported.

In greater detail, the principle component of the mechanical shuttering mechanism is an elongated shutter blade 500 (FIG. 5), pivotally mounted on one end, at post 502. Nearby, a shutter control solenoid 504 is mounted on yoke 332. An actuator rod 506 extends from shutter blade 500 to an armature 508 controlled by the solenoid 504. Whenever the solenoid 504 is energized, armature 508 is attracted to pull rod 506 and swing shutter blade 500 in direction A and thereby block the light that is passing through lens 354. Whenever the solenoid 504 is de-energized, a spring (not shown) associated with either or both shutter blade 500 and armature 508 causes the shutter blade 500 to swing in direction B and thereby enable the passage of light from the lens.

The glass flat control mechanism comprises a solenoid 510 having an armature 512. Glued to glass flat 68 is a plate 514 having a pin 516 embedded therein. Positioned above plate 514 and in front of solenoid 510 is a crank arm 518. A spring 520 extends from the armature 512 to one end of the carnk arm 518. The other end of the crank arm 518 is loosely connected to the pin 516. The spring 520 provides a shock-absorbing, actuating link for transferring motion from armature 512 to glass flat 68.

Thus, when solenoid 510 is energized, armature 512 is attracted, spring 520 is pulled, crank arm 518 swings in direction E, and glass flat 68 is lifted away from glass flat 66. When solenoid 510 is de-energized, armature 512 is released, and crank arm 518 swings in direction F. Glass flat 68 is released so that it comes to rest upon flat 66. This clamps the film in a flat optical plane between the two glass flats 66,68. The position of the glass flat 68 is sensed by a "Microswitch" 524 having an actuator arm 526 resting upon crank arm 518. Preferably, the glass flats are always closed when the shutter is opened so that the user never sees an unfocused image.

A method of and circuit for electrically shuttering the lens is shown in FIG. 6. The principal components of this circuit are a power source 550, a switching device 552, a current-limiting resistor 554, a capacitive reactor 556, an auto transformer 558, and a lamp 560. The power source 550 may be any suitable source such as a commercial house current (conventionally 120 volts, 60 Hz in the United States). The switching device 552 may be contacts controlled by a relay winding which is connected as the solenoid 504 is connected. In one embodiment, resistor 554 was 20 ohms and capacitor 556 was 7.5 u.f.

When the lens is to be shuttered, the switching device 552 is operated to the "Low" terminal. The full voltage of the commercial power is applied across the entirety of the auto transformer 558, via a current-limiting resistor 554. Therefore, a lower energy is fed through lamp 560 via a relatively smaller percentage of the transformer turns. The lamp filament is energized a a very low level and the projected image is effectively shuttered.

When the lens is to be unshuttered, the switching device 552 is operated to the "High" terminal. The full voltage of the commercial power is applied at terminal 562 across a fewer number of turns of the auto transformer. This means that the lamp 560 is energized via a greater percentage of the number of turns in the auto transformer. Also, a circuit is closed at contacts 564 in order to bypass the resistor 554, capacitor 556 and thereby energize the lamp at the full level of illumination. The lens is effectively unshuttered.

An alternative circuit for electrically shuttering the lens is shown in FIG. 7. This arrangement has a power source 550, a switching device 566, an autotransformer 574, and a lamp 576.

During shuttering, the switching device 566 is operated to the "Low" terminals. Thus, the full voltage of the commercial power source is applied across all the windings of the autotransformer 574. The lamp filament is energized at a low level as in the previous example. In the unshuttered, or "high" mode, the full voltage of the power source is applied at terminals 568 and 570, which is across a fewer number of turns of the autotransformer 574. The lamp 576 is thus energized at the full illumination voltage.

The effect of this switching is to turn the light off and on, but also to keep the lamp filament energized at all times to avoid the destructive effects of continuously switching the entire filament current off and on.

The sequence of operations is controlled by microprocessor 79. First, the solenoid 504 (or relay in the case of FIG. 6) is energized and lens 354 is closed by the shutter blade 500 (or lamp 560 is dimmed). Then, glass flat 68 is lifted by solenoid 510. Next, film 60 is transported until a desired photographic area comes between the glass flats 68,66. Then, the film transport is stopped and solenoid 510 is thereafter de-energized to release the glass flat and clamp the film in the plane which lens 354 focuses upon screen 54. Finally, solenoid 504 (or a relay in the case of FIG. 6) is de-energized to move the shutter blade 500 away from lens 354 (or to increase the illumination level of the lamp 560) so that the selected image is projected upon screen 54.

Those who are skilled in the art will readily perceive how the invention may be modified. Therefore, the appended claims are to be construed to cover all equivalent structures.

We claim:

1. In a film reader comprising a lens and associated film transport means and also a lamp and associated lamp circuit means therefore, a supply reel and take up reel having film thereon, means for moving film from one of said reels to the other and then stopping it to project a selected image thereon through said lens by means of the lamp and associated lamp circuit means, and means for switching said lamp circuit means between two modes, a first mode activated during transport of the film which energizes the lamp at a low level resulting in insufficient lamp intensity to project a readable image, and a second mode activated after the film is stopped which energizes the lamp at a high level resulting in sufficient lamp intensity to project a readable image, a pair of glass flats with one glass flat positioned on either side of the film and an electrically operated solenoid for opening said glass flats after said lamp is energized at the low level and before said film is transported and for closing said glass flats after said film is transported and before the lamp is energized at the high level, and microprocessor means for controlling the film transport means, glass flat solenoid and lamp circuit switching means, whereby the viewer does not see either a collapse of a focused image or a blurred montage of images being moved across a screen.

2. The lens and mechanism of claim 1 wherein said circuit means comprises an autotransformer and said switching means comprises means for alternatively energizing a greater number of transformer turns via a current limiting means or a fewer number of transformer turns independently of said current limiting means.

* * * * *